United States Patent [19]

Angelosanto et al.

[11] Patent Number: 5,065,611

[45] Date of Patent: Nov. 19, 1991

[54] SYSTEM FOR CALIBRATING THE SPAN OF PRESSURE MEASURING INSTRUMENTS

[75] Inventors: John P. Angelosanto, North Attleboro; George E. Sgourakes, Millis, both of Mass.

[73] Assignee: The Foxboro Company, Foxboro, Mass.

[21] Appl. No.: 394,013

[22] Filed: Aug. 15, 1989

[51] Int. Cl.[5] ............... G01L 27/00; G01L 19/04; G01L 19/12
[52] U.S. Cl. ............... 73/4 R; 73/708; 73/756
[58] Field of Search ............... 73/4 R, 4 V, 4 D, 708, 73/714, 700, 753, 756

[56] References Cited

U.S. PATENT DOCUMENTS

| 2,494,621 | 1/1950 | Jones ............................. 73/708 X |
| 2,600,271 | 6/1952 | Schaevitz ....................... 73/708 X |
| 2,627,183 | 2/1953 | Greenwood, Jr. et al. ........ 73/708 |
| 3,323,368 | 6/1967 | Glassey .......................... 73/708 X |
| 3,441,053 | 4/1969 | Robinson ........................ 137/595 |
| 3,855,974 | 12/1974 | Mayer ............................ 123/439 |
| 4,329,775 | 5/1982 | Olsen et al. ..................... 73/4 R X |
| 4,499,751 | 2/1985 | Riggs ............................. 73/4 R |
| 4,604,891 | 8/1986 | Sgourakes et al. ............... 73/4 R |
| 4,708,010 | 11/1987 | Sgourakes ....................... 73/4 R |
| 4,909,063 | 3/1990 | Olsen ............................. 73/4 R |

FOREIGN PATENT DOCUMENTS

| 2835523 | 2/1980 | Fed. Rep. of Germany ........ 73/708 |
| 150676 | 9/1962 | U.S.S.R. .......................... 73/708 |
| 960565 | 9/1982 | U.S.S.R. .......................... 73/4 R |
| 970156 | 10/1982 | U.S.S.R. .......................... 73/4 R |
| 972288 | 11/1982 | U.S.S.R. .......................... 73/4 R |
| 1280352 | 12/1986 | U.S.S.R. .......................... 73/4 R |
| 1339426 | 9/1987 | U.S.S.R. .......................... 73/4 R |

OTHER PUBLICATIONS

"Rotation of a Free-Piston Monometer Piston with Changes in its Tilt Angle", Measurement Techniques, vol. 19, No. 5, pp. 689-691, May 1976, (publ. Oct. 1976) by V. K. Maskaev.

Primary Examiner—Tom Noland
Attorney, Agent, or Firm—Parmelee, Bollinger & Bramblett

[57] ABSTRACT

A differential pressure measuring system comprising a transmitter for a pressure-measuring instrument connected to a control room by a two-wire transmission line carrying a d-c signal powered from the control room and representing the measured pressure. The instrument includes a reference pressure device of the falling-ball type, wherein a ball is first lifted to an upper position and then allowed to descend under the force of gravity to produce a reference pressure pulse for calibrating the instrument span. The lifting device for the ball is a two-coil magnetic actuator powered by current from the two-wire transmission line, and is operable at a sufficiently low current to be classified intrinsically safe. The reference pressure device is supported by an adjustable mounting providing two degrees of freedom for movement so as to permit ready adjustment of the device orientation to assure alignment with the force of gravity.

33 Claims, 4 Drawing Sheets

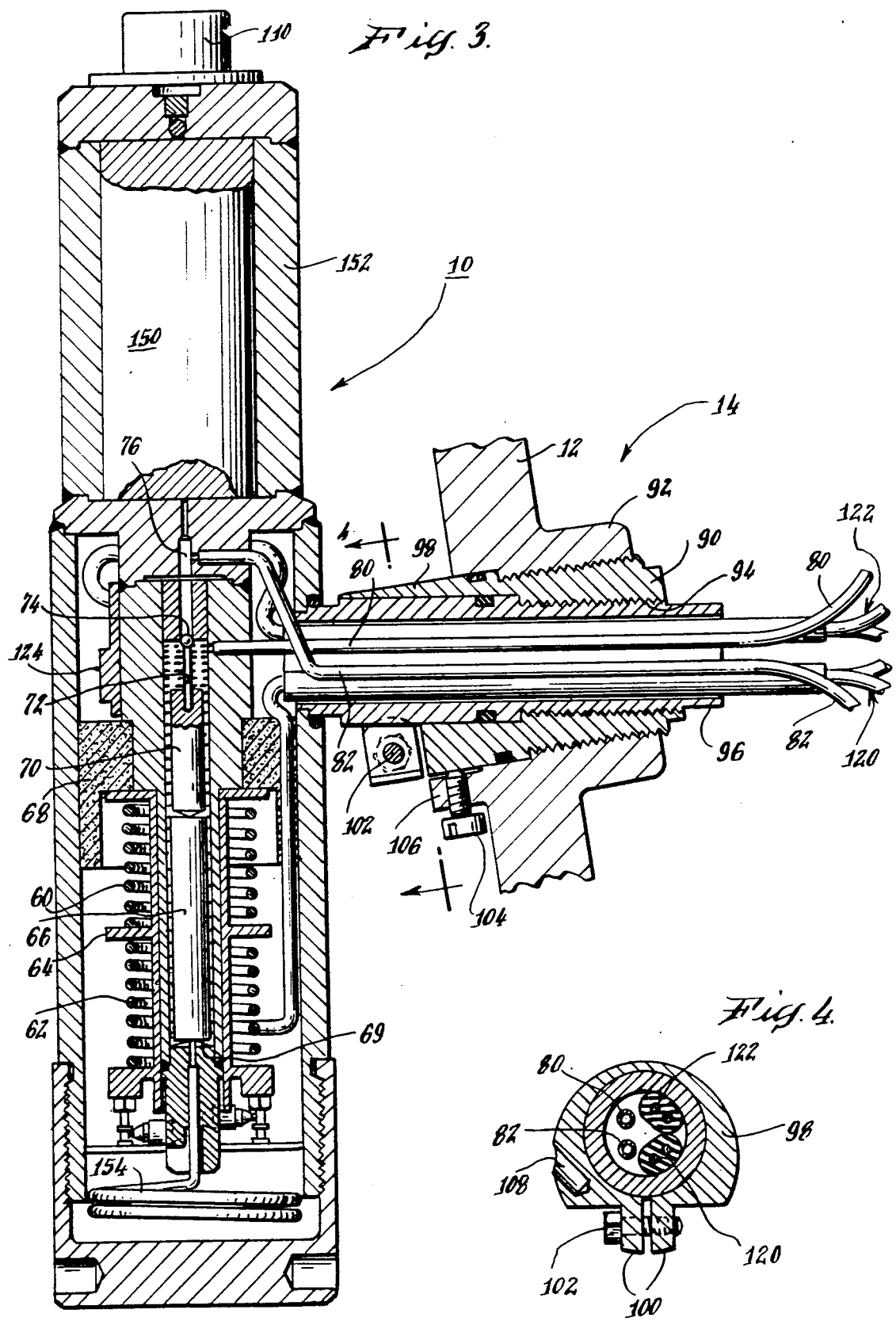

SYSTEM FOR CALIBRATING THE SPAN OF PRESSURE MEASURING INSTRUMENTS

BACKGROUND OF THE INVENTION

1. Field of the Invention

This invention relates to apparatus for measuring pressures, for example, differential pressures developed by flowing fluids. More particularly, this invention relates to apparatus and techniques for calibrating the span of pressure measuring instruments.

2. Description of the Prior Art

Pressure measuring instruments often are installed in locations where they are subject to widely varying environmental conditions, and thus it is not uncommon for the instrument calibration to shift unpredictably from time to time, thereby causing erroneous measurements. Accordingly, there has developed a need for some means of readily calibrating such instruments periodically, or when appropriate, so as to assure accurate readings. U.S. Pat. Nos. 4,604,891 and 4,708,010 assigned to the assignee of this application disclose apparatus for assisting in so calibrating the span of a pressure measuring instrument.

The apparatus shown in those patents comprises a reference pressure device located at the instrument and operable upon activation to develop a pressure pulse of predetermined magnitude. In one preferred embodiment, the device includes a vertically-oriented cylindrical tube containing a fill-liquid. A solid metal ball is raised by a solenoid to the top of the tube and then released. The ball drops under the force of gravity through the fill-liquid to produce a pressure pulse of essentially constant magnitude over much of the drop distance. This pressure pulse is applied to the sensing means of the instrument, and the resulting output signal is monitored to determine whether there has been a shift in the span calibration. If there has, circuitry associated with the instrument is adjusted to compensate for such shift, thereby to assure an accurate pressure reading.

Although the apparatus disclosed in the above two patents is fully capable of producing the desired reference pressure pulse, it has been found that certain additional operational characteristics would be especially useful in satisfying important user needs in industrial process instrumentation systems. For example, it is highly desirable to furnish users with apparatus which is "intrinsically safe", as determined by specified certifying agents empowered to rule on these matters. With the original designs as described in the above patents, this would be difficult to achieve because the relatively high power required to lift the ball (and an attached weight) necessarily introduced a large amount of electrical energy into the nearly-sealed spaces of the instrument interior. Also, the overall system of the original design was somewhat complex, requiring multiple circuits between the instrument and other stations connected thereto.

SUMMARY OF THE INVENTION

In a preferred embodiment of the present invention, a pressure measuring instrument is provided with a reference pressure device of the above-described type, but wherein the means for lifting the ball to its upper position requires considerably less electrical energy than heretofore. This lifting means comprises a pair of axially aligned coils positioned one above the other, and arranged to produce opposed magnetic fields. When the coils are energized, these fields act on a vertically movable permanent magnet, to shift it upwards to hoist the ball to its upper position in the fill-liquid. A magnetic pole piece surrounds the upper part of the top coil to assure good magnetic interaction. This lifting means performs its function while requiring a current of only about 15 milliamps. The earlier design disclosed in the above-listed patents required about 500 milliamps.

In accordance with an important feature of the system to be described, the magnetic lifting means is energized by current from the usual two-wire signal transmission line which connects the instrument to a control room or the like. This two-wire line carries a 4–20 milliamp output signal from the measuring instrument, and the current flow in the line typically is limited to a maximum of no more than about 21 milliamps, in order to provide for explosion proof (intrinsically safe) operation. Since only about 15 milliamps are required to operate the reference pressure device described above, the remaining current is available to power the electronic circuitry at the instrument during a reference pressure check.

Control of the reference pressure device, i.e. for initiating a reference pressure check, is in accordance with another aspect of the invention conveniently effected through use of a hand-held portable terminal which can be connected to the two-wire line at the instrument to permit communication between the terminal and the signal processor within the instrument.

In accordance with a still further feature of the invention, the reference pressure device is mounted to the instrument housing by means of a support providing two degrees of freedom for movement of the device. Thus the orientation of the device can quickly be adjusted to provide for alignment between the force of gravity and the axial direction in which the falling ball is constrained to move as it descends.

Other objects, aspects and advantages of the invention will in part be pointed out in, and in part apparent from, the following description of a preferred embodiment considered together with the accompanying drawings.

BRIEF DESCRIPTION OF THE DRAWINGS

FIG. 3 is a vertical section through the reference pressure device;

FIG. 4 is a detail section along line 4—4 of FIG. 3;

DESCRIPTION OF THE PREFERRED EMBODIMENT

Figure 1:
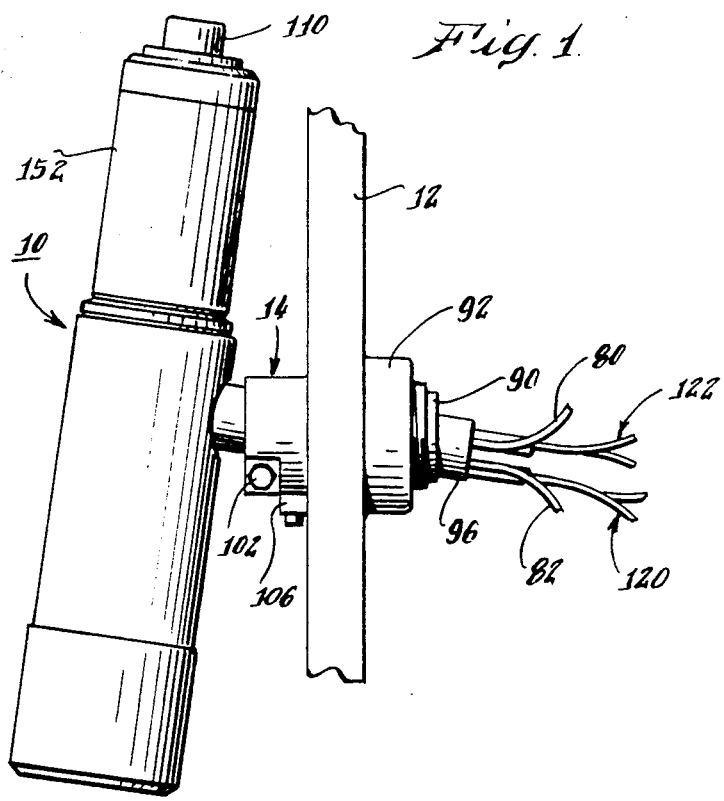
FIG. 1 is an elevation view of the reference pressure device and its mounting support.

Referring now to FIG. 1, there is shown a reference pressure device 10 which is arranged, when activated, to produce a pressure pulse of predetermined magnitude. This device includes a weighted ball (as will be described in more detail hereinbelow) which first is lifted to an upper position, and then is allowed to drop down under the force of gravity through a liquid-filled cavity to produce the reference pressure pulse. The device 10 is mounted to an instrument housing 12 by an eccentric support 14, also to be described hereinbelow. This support includes special means allowing for adjustment of the device 10 to permit it to be shifted from a non-vertical position (as shown) to a vertical position, as is required for proper operation of the falling-ball reference pressure device.

Figure 2:
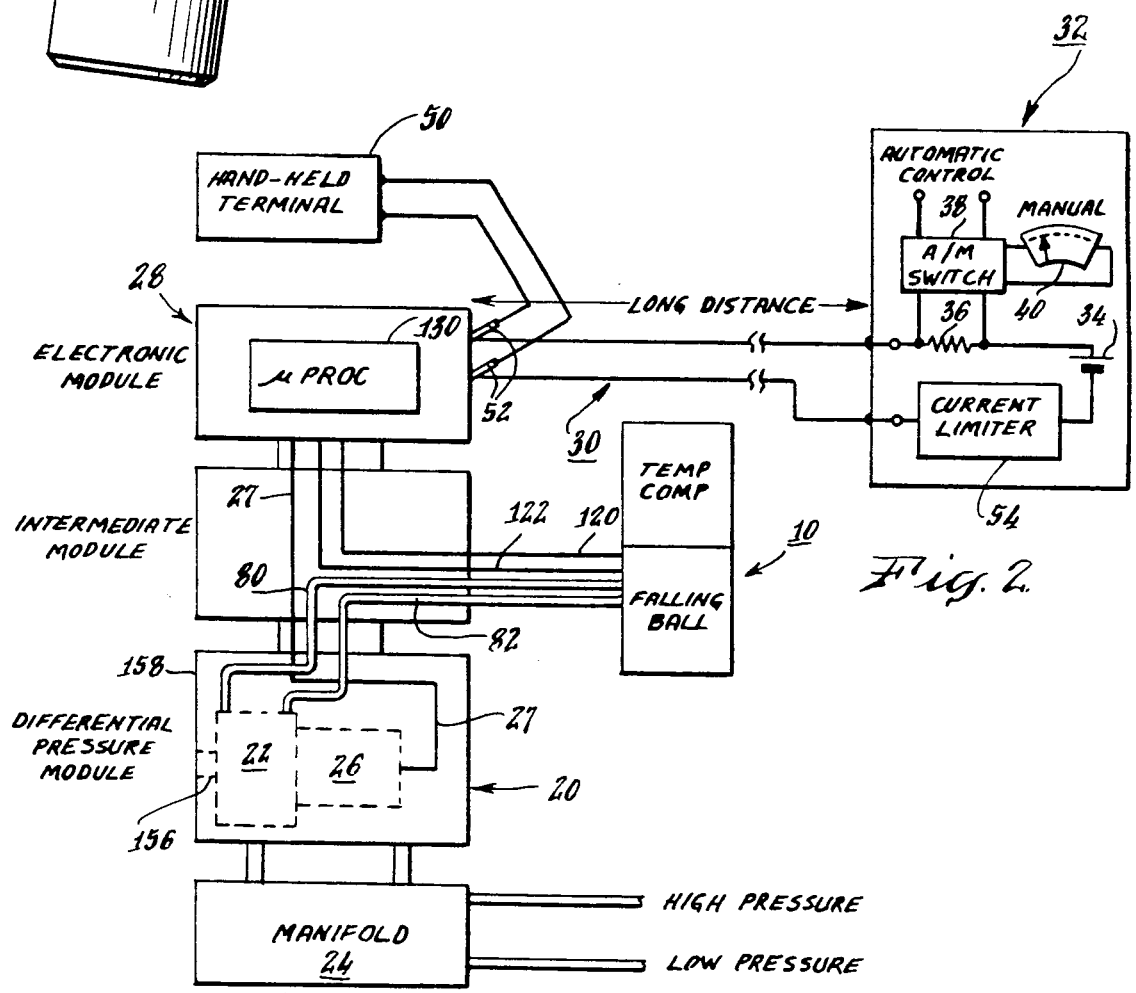
FIG. 2 is a block diagram showing the overall system in outline.

FIG. 2 shows diagrammatically the overall arrangement of the instrument system of which the reference pressure device 10 forms one part. The system basically comprises a differential pressure module 20 including n interior pressure chamber 22 to which a differential pressure from a manifold 24 is applied, typically through diaphragms as well known in the art. The instrument further includes a sensing element 26 responsive to the applied pressure, and arranged to produce a corresponding measurement signal, e.g. an a-c signal the frequency of which is modulated to correspond to the applied pressure. This measurement signal is directed (as by leads illustrated at 27) to an electronic module 28 which processes the signal together with other data to produce a d-c output signal corresponding to the measured differential pressure.

The electronic module 28 serves as a transmitter station to direct the d-c output signal through a conventional two-wire transmission line 30 to a receiving station 32 which may, for example, be located in a control room of the industrial process instrumentation system. This station includes a source of d-c power 34, shown diagrammatically as a battery, and which is connected in series with the transmission line 30. With this arrangement, the current in the line 30, although produced by the d-c source 34, is controlled in magnitude by the electronic module 28. Thus, the level of the line current (commonly in the range of 4-20 milliamps) serves as the output signal of the pressure measuring instrument.

This output signal current is converted by a series resistor 36 to a voltage signal which is directed to an auto/manual switch 38. Under most circumstances, this signal is further directed to an automatically-operable controller (not shown, but well known in the art) which develops a feedback signal for maintaining the controlled variable at an established set-point. Alternatively, the switch 38 can be put in manual condition, which as shown may activate a meter 40 to display the measured value.

In accordance with an important feature of the present invention, operation of the reference pressure device 10 is powered by current drawn directly from the two-wire transmission line 30, i.e. from the d-c voltage source. This simplifies the system considerably, as compared to arrangements where separate circuits are used for conveying measurement signals and operating power for the reference pressure device.

Activation of the reference pressure device 10 is, in the disclosed embodiment, controlled by a hand-held portable terminal unit 50 of conventional construction. This terminal basically comprises a small push-button-controlled digital computer with stored programs and a display device (not shown) for indicating to the operator the status of certain conditions and for presenting a menu of options to be selected. The terminal 50 is connected to the two-wire line 30 where it enters the electronic module 28, as by releasable connectors 52 of any suitable design.

Since the current in the two-wire line 30 flows also into the interior of the electronic module 28, it is important that the magnitude of the line current be limited to a level sufficiently low to permit the system to be certified as "intrinsically safe". Typically, the users of such two-wire transmission lines provide a current limiter, as illustrated at 54, to prevent the current from exceeding some preset level. For example, a limit level of about 21 milliamps is not uncommon for a 4-20 milliamp line. Part of the line current must be used for powering the signal processing and other circuitry in the electronic module, and typically that will require 4 milliamps or less. The reference pressure device 10 thus must be capable of operation with the remaining current flowing in the two-wire line, i.e. about 16 milliamps.

Operation of a falling-ball type of reference pressure device 10 with such a relatively small amount of current is difficult to achieve because a significant amount of power is required to lift the weighted ball up to its start position. For example, the device shown in the above-mentioned U.S. Pat. No. 4,708,010 employed for lifting the ball to its upper position a solenoid which required approximately 500 milliamps for its operation. Such an arrangement clearly does not permit achieving the concept of the present invention of powering the device directly from the two-wire line 30. In accordance with an important feature of the invention, however, this problem has been solved by use of a lifting arrangement which can function with a current level of about 15 milliamps.

Figure 5:
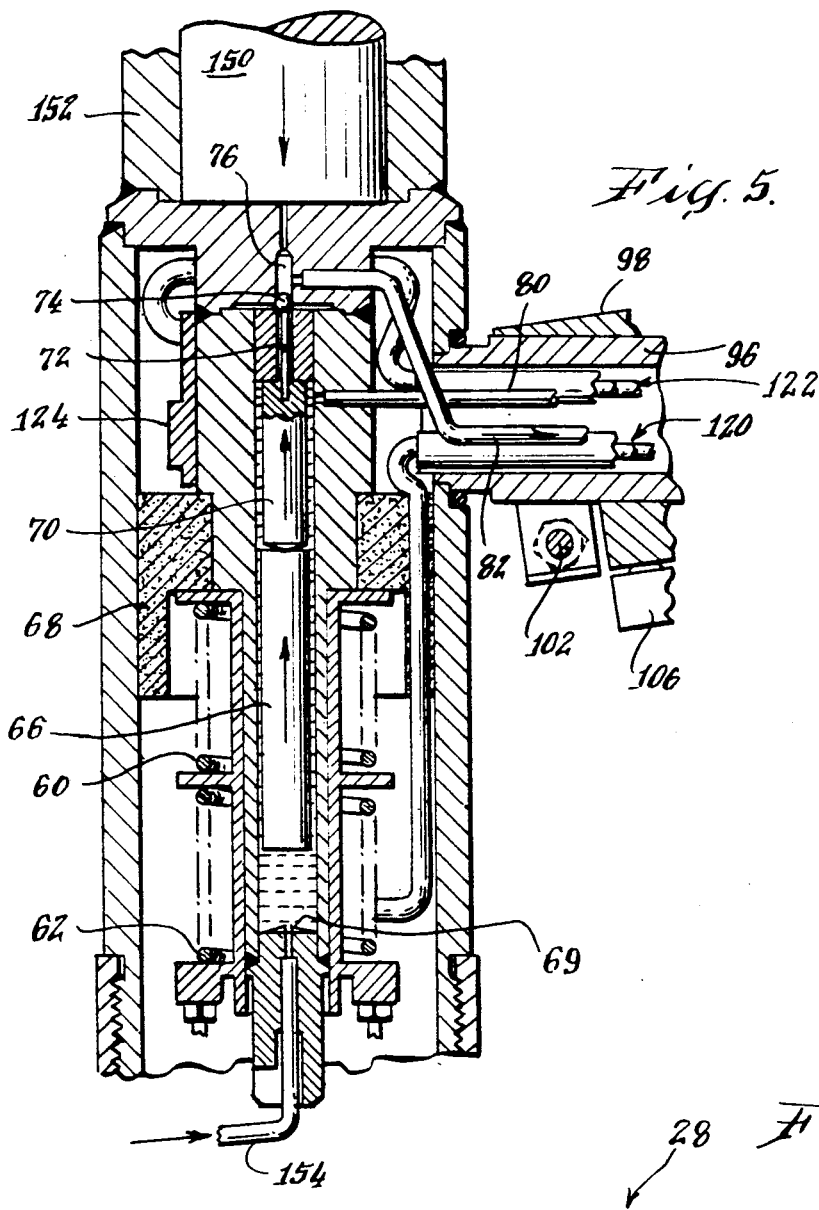
FIG. 5 is an enlarged vertical section of a portion of the reference pressure device.

In more detail now, and turning to FIGS. 3 and 5, the required lifting force is developed by the magnetic fields produced by a pair of vertically-aligned coils 60, 62. These coils are wound in opposite directions on upper and lower sections of a coil bobbin 64, and are energized in series by current derived directly from the two-wire line 30. The opposed magnetic fields produced by these reversely-wound coils act on a force element 66 comprising a cylindrical permanent magnet positioned centrally in the interior of the coils 60, 62. A cylindrical disc-shaped pole piece 68 of magnetic material is positioned coaxially about the upper portion of the upper coil to focus the magnetic field and to assure good interaction between the coils and the permanent magnet 66. This pole piece extends significantly the height that the ball/weight combination can be hoisted with effective force.

The force element 66 rests at its bottom end on the point of a fixed conical base 69, and supports on its upper surface a non-magnetic weight 70 (the lower end of which has a conical projection to make definitive contact with the permanent magnet). The force element 66 is not secured to the weight 70, and thus is free to move independently of that weight. A rod 72 extends up from the weight 70 and is secured at its upper end to a metal ball 74 which, initially, is located just beneath the opening to an upwardly-extending cylindrical cavity 76. This cavity, together with the spaces surrounding the rod 72, the weight 70, the force element 66 and all other regions communicating therewith (to be described), contains a fill-fluid which preferably is a liquid of suitable viscosity.

To initiate operation of the reference pressure device 10, the hand-held terminal 50 is connected to the instrument as shown, and is actuated (as will be more fully described) to direct digital control signals to the electronic module 28. As part of the sequence of operation, the signal processor portion of the electronic module activates switching circuitry to connect the coils 60, 62 directly to the two-wire line 30. The opposed magnetic fields produced by current from that line develop a force on the permanent magnet 66 causing it to move upwardly to hoist the weight 70 and ball 74 to an upper position (see FIG. 5) where the ball is just above the upper end of the cavity 76.

The connection between the coils 60, 62 and the two-wire line 30 then is interrupted. Preferably, in addition, the two-wire line is re-connected to the coils but in reverse sense, thereby applying a downward force to the permanent magnet 66. This assures that the magnet 66 will break free from any attraction it may have to surrounding metal components and be driven down from beneath the weight/rod/ball assembly. Thus, that assembly can descend under the force of gravity to produce in the fill-liquid a reference pressure pulse of proper magnitude for calibrating the span of the instrument, in accordance with principles previously outlined.

This reference pressure pulse is conveyed through hydraulic connections 80, 82 to the interior pressure chamber 22 (FIG. 2) where it is detected by the sensing element 26. The sensing element produces a corresponding measurement signal which in the electronic module 2 is converted to an output signal corresponding in magnitude to the pressure of the reference pulse from the falling ball. The output signal magnitude is checked in the electronic module and if its magnitude indicates that there has been a span shift, corrective measures are taken to reset the calibration of the instrument.

Referring again to FIG. 3, the adjustable support 14 is provided to enable a user to position the reference pressure device 10 with its internal cavity 76 precisely vertical. Such adjustability of the orientation is provided partly to simplify the initial installation, and also to permit easy readjustment subsequent to installation, since the orientation can change over time. The support 14 provides two degrees of freedom for movement of the device 10, so as to assure that its longitudinal axis can readily be aligned with the force of gravity, regardless of the starting position.

The adjustable support 14 includes an outer cylindrical member 90 which is threadedly engaged within a boss 92 forming part of the housing 12. This outer member is formed with a cylindrical passageway 94 the axis of which is angularly-offset with respect to the axis of the outer member 90. Threadedly engaged within this passageway is an inner cylindrical member 96 serving as a mounting tube and having its axis aligned with the angularly-offset axis of the passageway 94.

The outer member 90 is provided with a split-ring extension 98 having (see also FIG. 4) a pair of adjacent fingers 100. A machine screw 102 is provided to draw these parts together to clamp the outer member 90 to the mounting tube 96. A set screw 104 also is provided in a boss 106 on the housing 12 to engage the outer member 90 to hold it in place after it has been properly set in position. The extension 98 may be formed with a hole 108 to receive a tool to facilitate positioning movement. To assure that the device 10 is positioned precisely aligned with gravity, the top of the device is fitted with a conventional bubble-type indicator 110, viewable from above the device.

When the screws 102 and 104 are backed off, the two members 90 and 96 can be moved with respect to each other, and with respect to the housing 12, to provide for positioning the reference pressure device 10 vertically. A convenient sequence for this adjustment is to start with the mounting tube 96, as by grasping the device 10 to rotate the tube 96 within the passageway 94 until the device is as close to vertical as it can be. At this point, the longitudinal axis of the device 10 will lie in a vertical plane, and the bubble of the level indicator 110 will be nearly in the center.

Thereafter, the outer member 90 (also referred to as the eccentric clamp) can be rotated within the housing structure 12, while maintaining the device 10 with its longitudinal axis lying in a vertical plane, until the device axis is precisely vertical as shown by the bubble indicator 110. This adjustment can be made most easily with the aid of a tool inserted in the hole 108. Then the screws 102, 104 are set to hold the movable parts in place.

As also shown in FIG. 3, the hydraulic lines 80, 82 pass through the mounting tube 96 to effect pressure communication between the reference pressure device 10 and the interior chamber 22 of the instrument. The current for the coils 60, 62 in the device 10 is supplied through a pair of wires 120 which pass through the mounting tube 96 and thence to the electronic module 28 (see also FIG. 2). A second pair of wires 122 is provided to connect a temperature sensor 124 (in the device 10) to the electronic module 28, to furnish temperature data for compensating circuitry in that module.

Figure 6:
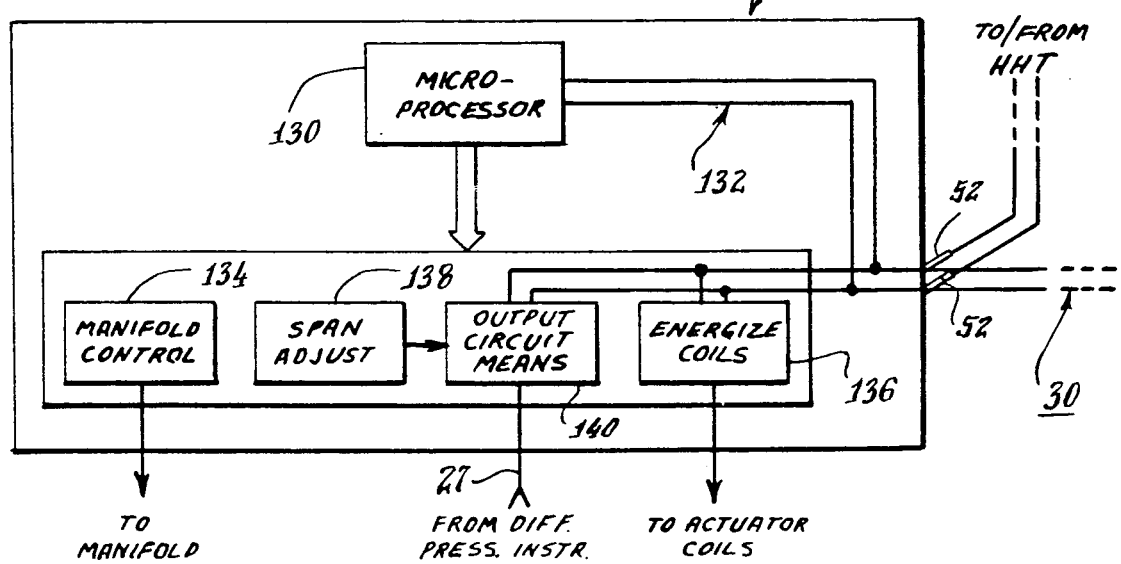
FIG. 6 is a block diagram showing elements of the signal processing section of the instrument.

Referring now to FIG. 6, the electronic module 28 basically comprises a digital microprocessor 130 which receives digital input signals through a pair of leads 132 connected to the transmission line 30. The hand-held terminal (HHT) 50 is connected to that line, as previously described, and thus can communicate directly with the microprocessor, as by digital signals of conventional format. The electronic module also includes a number of function circuits which are monitored by, and under the control of, the microprocessor. To simplify the presentation, only four such function circuits 134–140 are shown.

Figure 7:
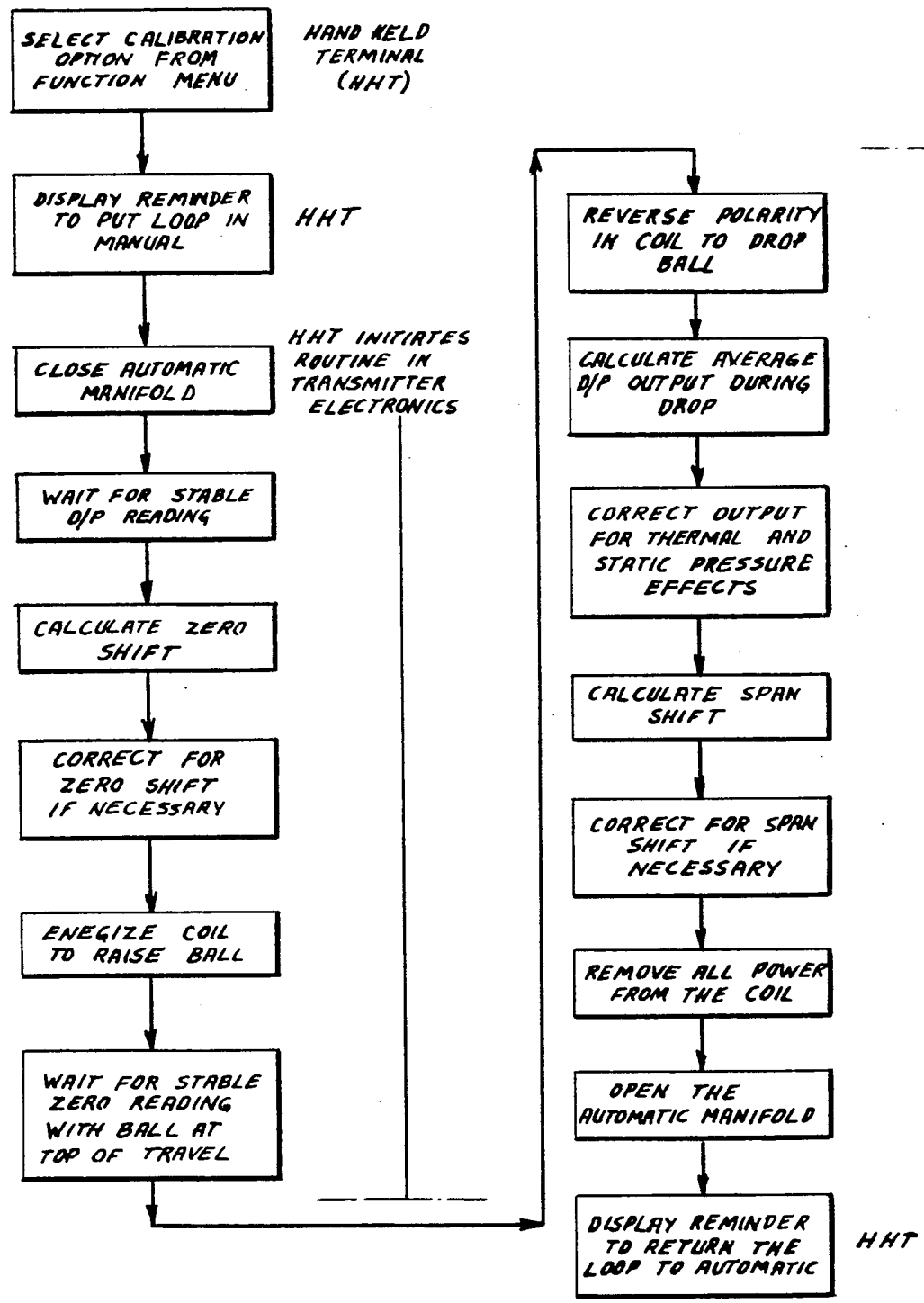
FIG. 7 is a flow diagram illustrating the sequential steps taken in carrying out a calibration of the instrument.

FIG. 7 presents a flow chart indicating the sequence of events carried out for checking and resetting the calibration of the instrument. The first two steps are performed at the hand-held terminal (HHT) 50, wherein the HHT first selects (by push-button control) the calibration option from a menu. The HHT then displays a reminder to the user to place the loop in manual condition. This can be done by placing a call to personnel at the control room 32 to request that the switch 38 be placed in manual state. Thereafter, the HHT is operated to start the calibration routine which is carried out by the microprocessor at the electronic module 28.

As set forth in FIG. 7, the microprocessor 130 first activates the manifold control circuit 134 (FIG. 6) which in conventional fashion energizes an actuator at the manifold 34 to zeroize the differential pressure at the instrument. The microprocessor then checks for zero shift and corrects any that is found. Thereafter, the microprocessor starts the span calibration by instructing the "energize coils" function circuit 136 to connect the line 30 to the coils 60, 62, thereby causing the ball 74 to be raised to its upper position.

After obtaining a stable reading of differential pressure, the microprocessor 130 then causes the polarity of the coil energization to be reversed. The permanent magnet 66 thereupon is forced down from beneath the weight 70, and the weighted ball 74 thereupon drops down through the cavity 76 under the force of gravity to produce the reference pressure pulse. The microprocessor thereafter makes appropriate calculations as indicated in FIG. 7, and corrects for span shift if necessary, as by directing control signals to the "span adjust" function circuit 138. Power is then removed from the coils 60, 62, the manifold 34 is opened, and the loop is returned to automatic control. Thereafter, the actual differential pressure from the line is applied to the instrument, and the "output circuit" 140 controls the d-c signal in the two-wire line 30 to provide an accurate measurement signal.

Reverting now to the reference pressure device 10 as shown in FIG. 3, the volume of the interior spaces containing the fill-liquid are controlled in accordance with changes in ambient temperature so as to assure that expansion/contraction of the liquid does not introduce measurement errors. For that purpose, the upper portion of the device 10 includes a solid Invar cylinder 150 in a surrounding stainless steel tube 152. The spaces between the cylinder and the tube contain fill-liquid in communication with the fill-liquid in the cavity 76 and associated regions (previously described). With a rise in temperature, the stainless steel tube 152 expands significantly while the Invar cylinder expands very little. Thus the spaces between these two elements increases, and the design is such that the increase in volume is just the correct amount to provide room for the increased volume of fill-liquid resulting from the temperature rise.

At the lower end of the device 10, the fill-liquid regions are connected to a helical tube 154. This tube can be individually trimmed for each instrument, by pinching the tube off at a place determined by offset measurements, thereby to set the initial liquid volume so as to minimize offset.

Although a specific preferred embodiment of the invention has been shown and described herein in detail, it is desired to emphasize that this has been for the purpose of illustrating the invention, and should not be considered as necessarily limitative of the invention, it being understood that many modifications can be made by those skilled in the art while still practicing the invention claimed herein.

For example, although the reference pressure device is in the preferred embodiment activated by a hand-held terminal, it will be evident that such activation could be effected remotely, as by signals developed at the control room. Also, although the reference pressure device is mounted externally of one of the instrument modules, other locations are feasible. Still other possible modifications will be apparent to those skilled in this art.

What is claimed is:

1. In a pressure-measuring instrument of the type comprising means to receive an input pressure to be measured and sensing means responsive to the input pressure for producing a corresponding measurement signal;

said instrument further including a reference pressure device comprising means forming a cavity containing a fill-fluid communicating with said sensing means; an object in the cavity fill-fluid and movable between upper and lower positions; said object having at least a part thereof sized to provide a close fit with walls defining said cavity so that said part when moved by the force of gravity down through said cavity will produce a reference pressure for said sensing means to provide for calibration of said instrument; and power means for raising said object to said upper position from which it can descend under the force of gravity to produce said reference pressure;

that improvement in said instrument wherein said power means for raising said object includes:

a pair of coils positioned one above the other with their axes aligned;

said coils being arranged so as to produce opposed magnetic fields when energized; and a vertically-movable force element comprising a permanent magnet positioned within said coils and responsive to said magnetic fields, said force element being shiftable upwards when said coils are energized thereby to lift said object to its upper position from which it can descend under gravity to develop said reference pressure.

2. A pressure-measuring instrument as in claim 1, including a magnetic pole piece adjacent at least one of said pair of coils.

3. A pressure-measuring instrument as in claim 2, wherein said pole piece is adjacent the top of the upper one of said coils.

4. A pressure-measuring instrument as in claim 3, wherein said pole piece comprises a cylindrical disc member of magnetic material surrounding the upper portion of said upper coil.

5. A pressure-measuring instrument as in claim 1, including a coil bobbin having upper and lower sections for said pair of coils respectively;

said coils being wound about said bobbin in opposite directions and connected in series so as to be energized by a single source of current.

6. A pressure-measuring instrument as in claim 1, including temperature-compensation means forming part of said reference pressure device and comprising temperature-responsive variable-volume means communicating with said cavity fill-fluid to provide changes in volume with changes in temperature so as to accommodate variations in volume of said fill-fluid.

7. A pressure-measuring instrument as in claim 6, wherein said variable-volume means comprises two adjacent elements of different materials having different temperature coefficients of expansion to effect changes in the space between said elements with changes in temperature.

8. In the art of calibrating the span of a pressure measuring instrument using a reference pressure pulse produced by raising an object to an upper position in a closely-fitting cavity containing a fill-fluid, the object thereafter being allowed to descend under the force of gravity through the fill-fluid to a lower position to develop a reference pressure pulse to be supplied to sensing means of the instrument which sensing means produces a corresponding signal to be monitored so as to determine whether any change in calibration is needed;

the improved method for hoisting said object to its upper position including the steps of:

applying opposed magnetic fields to a movably mounted permanent magnet to create a force tending to move said magnet upwardly; and directing the upward movement of said permanent magnet against said object to hoist it to said upper position.

9. The method of claim 8, wherein said opposed magnetic fields are developed by a pair of vertically-aligned coils.

10. The method of claim 8, including the step of reversing the direction of said opposed magnetic fields after said object has reached said upper position, thereby producing a downward force on said permanent magnet tending to move said magnet down away from said object.

11. The method of claim 8, including the step of focusing at least one of said magnetic fields by the interposition of a magnetic pole piece.

12. A pressure measuring system comprising:
(A) a transmitter station including a pressure-measuring instrument with:
  (1) sensing means responsive to an input pressure signal; and
  (2) signal-processing means including circuit means operable with said sensing means for producing an output signal;
(B) a two-wire line connected at one to said pressure measuring instrument;
(C) a receiving station connected to the other end of said two-wire line;
(D) said receiving station including electrical power means to supply current to said two-wire line for energizing said signal-processing means and for producing said output signal in said two-wire line to be measured at said receiving station;
(E) said instrument further including a reference pressure device comprising:
  (1) means forming a cavity containing a fill-fluid and communicating with said sensing means;
  (2) an object in the cavity fill-fluid and movable between upper and lower positions;
  (3) said object having at least a part thereof sized to provide a close fit with walls defining said cavity so that said part when moved by the force of gravity down through said cavity will produce a reference pressure signal for said instrument;
  (4) power means for raising said object to said upper position from which it can descend under the force of gravity to produce said reference pressure; and
(F) said signal-processing means being operable to activate said power means by coupling thereto current from said two-wire line so that said power means will raise said object to its upper position.

13. A pressure measuring system as in claim 12, including signalling means coupled to said two-wire line for communicating with said signal-processing means to direct said signal-processing means to activate said power means from said two-wire line to raise said object to its upper position and to release said object to allow said part thereof to descend under gravity to develop said reference pressure.

14. A pressure measuring system as in claim 13, wherein said circuit means produces a d-c output signal; said signalling means communicating with said instrument signal-processing means through the medium of digital signals.

15. A pressure measuring system as in claim 13, wherein said signalling means comprises a portable hand-held terminal connected to said two-wire line.

16. A pressure measuring system as in claim 15, wherein said hand-held terminal comprises leads connected to said two-wire line close to the point where said line is connected to said pressure-measuring instrument;
said hand-held terminal leads including releasable connector means for effecting connecting to said two-wire line.

17. A pressure measuring system as in claim 13, wherein said instrument signal processing means includes means for adjusting the span of said output signal;
said adjusting means being operable to effect any changes required in the span of the instrument as reflected by the magnitude of the output signal produced by said reference pressure.

18. A pressure measuring system as in claim 17, wherein said signalling means comprises a portable hand-held terminal connected to said two-wire line and including means to initiate a sequence of operations of said signal processing means including the operation of adjusting the span of said instrument.

19. A pressure measuring system as in claim 12, wherein said two-wire line is energized by direct current from said receiving station, the level of said direct current being controlled by said circuit means to serve as the instrument output signal;
means to limit the magnitude of said direct current to a predetermined maximum amount as required to assure intrinsic safety for said instrument;
said signal-processing means and said power means being operable simultaneously while consuming together no more than said predetermined maximum amount of current.

20. A pressure measuring system as in claim 12, wherein said power means comprises magnetic force-producing means including coil means energized by current from said two-wire line;
said coil means being arranged to produce a magnetic field when energized; and
a permanent magnet acted upon by said magnetic field to produce the force required to lift said object.

21. A pressure measuring system as in claim 20, including a magnetic pole piece adjacent at least a part of said coil means.

22. A pressure measuring system as in claim 21, wherein said coil means comprises first and second coils in axial alignment one above the other and arranged when energized to produce opposed magnetic fields.

23. A pressure measuring system as in claim 22, wherein said coils have a greater axial length than said permanent magnet.

24. A pressure measuring system as in claim 20, wherein said coil means is energized in one polarity to raise said object; and
means for energizing said coil means in reverse polarity after said object has been raised, thereby to force said permanent magnet down towards its lower position;
said permanent magnet being below said object and free of any connection to said object whereby said permanent magnet can be forced downwardly by said reverse polarity energization without said permanent magnet applying any force to said object.

25. In a pressure-measuring instrument of the type comprising means to receive a pressure to be measured and sensing means responsive to such pressure for producing a corresponding measurement signal;
said instrument further including a reference pressure device comprising means forming a cavity having an axial direction, said cavity containing a fill-fluid and communicating with said sensing means; an object in the cavity fill-fluid and movable vertically between upper and lower positions; said object having at least a part thereof sized to provide a close fit with walls defining said cavity so that said part when moved by the force of gravity down through said cavity will produce a reference pressure for said instrument; power means for raising said object to said upper position from which it can descend under the force of gravity to produce said reference pressure; a housing member; and support means securing said reference pressure device to said housing member;

that improvement in said instrument wherein said support means comprises:

an outer member rotatably mounted with respect to said housing member;

said outer member being formed with a passageway extending therethrough in a direction which is angularly-disposed with respect to the axis of rotation of said outer member;

an inner member extending through said passageway and rotatably mounted therein; and means securing said reference pressure device to said inner member, whereby movement of said outer and inner members can be effected to position said reference pressure device with said cavity axial direction vertical.

26. A pressure-measuring instrument as in claim 25, wherein said inner member is tubular; and electrical leads extending through said tubular member to provide electrical current to said power means of said reference pressure device.

27. A pressure-measuring instrument as in claim 26, including hydraulic lines extending through said tubular member to couple the pressure developed in said cavity to said sensing means.

28. A pressure-measuring instrument as in claim 25, wherein said outer member is cylindrical and is threadedly engaged in said housing member;

said passageway being cylindrical with its axis angularly offset with respect to the axis of said passageway.

29. A pressure-measuring instrument as in claim 28, wherein said inner member is cylindrical and is threadedly engaged in said outer member.

30. In a pressure-measuring instrument of the type comprising means to receive an input pressure to be measured and sensing means responsive to the input pressure for producing a corresponding measurement signal;

said instrument further including a reference pressure device comprising means forming a cavity containing a fill-fluid communicating with said sensing means; an object in the cavity fill-fluid and movable between upper and lower positions; said object having at least a part thereof sized to provide a close fit with walls defining said cavity so that said part when moved by the force of gravity down through said cavity will produce a reference pressure for said sensing means to provide for calibration of said instrument; and power means for raising said object to said upper position from which it can descend under the force of gravity to produce said reference pressure;

that improvement in said instrument wherein said power means for raising said object includes:

a pair of coils positioned one above the other with their axes aligned;

said coils being arranged so as to produce opposed magnetic fields when energized;

a vertically-movable force element comprising a permanent magnet positioned within said coils and responsive to said magnetic fields, said force element being shiftable upwards when said coils are energized thereby to lift said object to its upper position from which it can descend under gravity to develop said reference pressure;

a housing;

support means for said reference pressure device fixed to said housing;

said support means comprising adjustable means to provide for movement of said reference pressure device to accommodate positioning said device with an axial direction of said cavity aligned with the force of gravity.

31. A pressure-measuring instrument as in claim 30, wherein said adjustable means includes means to accommodate at least two degrees of freedom for said device.

32. A pressure-measuring instrument as in claim 30, wherein said object comprises a weight rigidly attached to said part and located below said cavity to augment the gravity force applied to said part;

said force element being engageable with said weight to hoist it and said part together to said upper position upon energization of said coils.

33. In the art of calibrating the span of a pressure measuring instrument using a reference pressure pulse produced by raising an object to an upper position in a closely-fitting cavity containing a fill-fluid, the object thereafter being allowed to descend under the force of gravity through the fill-fluid to a lower position to develop a reference pressure pulse to be supplied to sensing means of the instrument which sensing means produces a corresponding signal to be monitored so as to determine whether any change in calibration is needed;

the improved method for hoisting said object to its upper position including the step of:

applying opposed magnetic fields to a permanent magnet operatively coupled to said object in such a fashion that an upwardly-directed force on said permanent magnet is transmitted to said object;

said opposed magnetic fields creating a force on said permanent magnet tending to move it upwardly;

thereby hoisting said object to said upper position.

* * * * *